United States Patent
Oishi et al.

(10) Patent No.: US 6,806,802 B2
(45) Date of Patent: Oct. 19, 2004

(54) ELECTROMAGNETIC DRIVING DEVICE AND FLOW RATE CONTROLLING APPARATUS EMPLOYING THE SAME DRIVING DEVICE

(75) Inventors: Kenichi Oishi, Oobu (JP); Motoyoshi Ando, Nagoya (JP); Hiroyuki Nakane, Okazaki (JP)

(73) Assignee: Denso Corporation (JP)

( * ) Notice: Subject to any disclaimer, the term of this patent is extended or adjusted under 35 U.S.C. 154(b) by 11 days.

(21) Appl. No.: 10/055,034

(22) Filed: Jan. 25, 2002

(65) Prior Publication Data

US 2002/0101314 A1 Aug. 1, 2002

(30) Foreign Application Priority Data

Jan. 26, 2001 (JP) ......................................... 2001-018111

(51) Int. Cl.[7] ................................................. H01H 3/00
(52) U.S. Cl. ....................................... 335/220; 335/251
(58) Field of Search ................................ 335/250–251, 335/281–282, 220–230; 251/129.01–129.19

(56) References Cited

U.S. PATENT DOCUMENTS

| | | | | |
|---|---|---|---|---|
| 4,399,483 A | * | 8/1983 | Phelan | ........................ 361/154 |
| 4,470,030 A | * | 9/1984 | Myers | ........................ 335/228 |
| 6,405,757 B1 | * | 6/2002 | Jabcon | .................. 137/625.65 |
| 6,543,744 B2 | * | 4/2003 | Carrillo et al. | ........ 251/129.08 |

* cited by examiner

Primary Examiner—Lincoln Donovan
(74) Attorney, Agent, or Firm—Nixon & Vanderhye PC (57) ABSTRACT

Non-magnetic layers are formed on an inner circumferential wall of a housing portion 13 and an outer circumferential wall of a plunger 17, respectively. Assuming that the thickness of the non-magnetic layer of the housing portion is $t0$, the thickness of the non-magnetic layer of the plunger is $t1$, a magnetic gap formed in a radial direction between respective magnetic materials of the housing portion and the plunger which excludes the non-magnetic layers is $d0$, and an air gap formed in a radial direction between the non-magnetic layers when the plunger does not deviate from but remains coaxial with the housing portion is $d1$, the thickness are set so as to satisfy $40\,\mu m \leq t0+t1 \leq 80\,\mu m$, $d0 \approx 100\,\mu m$. In addition, it is set such that the attracting portion becomes saturated magnetically when the value of electric current that is supplied to a coil increases to reach a predetermined value which falls between 40% or larger and 60% of smaller of a maximum value of the electric current.

5 Claims, 5 Drawing Sheets

ELECTROMAGNETIC DRIVING DEVICE AND FLOW RATE CONTROLLING APPARATUS EMPLOYING THE SAME DRIVING DEVICE

BACKGROUND OF THE INVENTION

1. Field of the Invention

The present invention relates to an electromagnetic driving device, in which a movable core is supported in a housing portion which co-operates with the movable core to form an electromagnetic circuit, and a flow rate controlling apparatus employing the electromagnetic driving device.

2. Description of the Related Art

In an electromagnetic driving device in which an electromagnetic circuit is constituted by a movable core, a housing portion for housing therein the movable core in such a manner as to move in a reciprocating fashion and an attracting portion for attracting the movable core in one of reciprocating directions by virtue of magnetic attraction, it is known, as a means for supporting the movable core in such a manner as to move in the reciprocating fashion, to carry a shaft press fitted in the movable core on a bearing or to support the movable core with a plate spring. With these supporting means, since the housing portion and the movable core do not slide on each other and therefore the resistance value of, for example, friction generated by the reciprocating movement of the movable core is not affected by the value of electric current that is supplied to a coil of the electromagnetic driving device, the reciprocating positions of the movable core remain substantially constant both in increasing and decreasing directions of the value of electric current that is supplied to the coil in case the current value remains the same. Namely, the hysteresis of the reciprocating positions of the movable core is small relative to electric current that is supplied to the coil.

However, since the movable core is supported by the housing portion which houses therein the movable core in such a manner as to reciprocate and co-operates with the movable core for formation of an electromagnetic circuit and the bearing or plate spring which is a separate member, there may occur a case in which the axial centers of the housing and the movable core deviate from each other. If the axial centers of the housing and the movable core deviate from each other, the movable core slides on the housing portion locally, whereby there may be a risk of imbalanced wear of the movable core. In order to prevent the occurrence of imbalanced wear due to such an axial center deviation, it is a general practice to provide a larger gap between the movable core and the housing portion in a radial direction which is normal to the direction in which the movable core reciprocates so as to prevent the movable core from sliding on the housing portion locally. However, with the larger gap formed between the movable core and the housing in the radial direction, the magnetic flux which flows through the magnetic circuit constituted by the housing portion, the attracting portion and the movable core, lowers, and an attracting force acting between the movable core and the attracting portion lowers in turn. Then, if the number of turns of the coil is increased in order to prevent reduction in the magnitude of the attracting force, there is caused a problem that the size of the electromagnetic driving device is enlarged.

With a view to solving the problem, it is considered that the gap formed radially between the housing portion and the movable core should be made as small as possible by allowing the movable core to be supported directly on the housing portion. Even in the construction in which the housing portion directly supports the movable core, in order for the movable core to slide smoothly, a gap is formed in a radial direction between an inner circumferential wall of the housing portion and an outer circumferential wall of the movable core (hereinafter, the "gap formed in the radial direction between the inner circumferential wall of the housing portion and the outer circumferential wall of the movable core" is referred to as a side gap). However, if the movable core becomes eccentric relative to the housing portion when the movable core reciprocates, there is generated a portion where the side gap becomes narrow locally, and a force with which the movable core is attracted in the radial direction by the housing portion (hereinafter, the "force with which the movable core is attracted in the radial direction by the housing portion" is referred to as a "side force") becomes large.

Furthermore, a sliding resistance generated between the housing portion and the movable core increases as the value of electric current supplied to the coil increases. Therefore, the hysteresis of the reciprocating positions of the movable core relative to the electric current value becomes large in increasing and decreasing directions of the value of electric current that is supplied to the coil. For example, in a case where an electromagnetic driving device is used in a flow rate controlling apparatus, there is caused a problem that the flow rate or the fluid pressure becomes different between the increasing direction and the decreasing direction of electric current.

SUMMARY OF THE INVENTION

An object of the present invention it to provide an electromagnetic apparatus in which a movable core is supported by a housing portion, in which the hysteresis of reciprocating positions of the movable core is small relative to the value of electric current that is supplied to a coil and which can be miniaturized, and a flow rate controlling apparatus employing the same driving device.

With any of an attracting portion, a housing portion and a movable core being set to become magnetically saturated with an electric current value which exceeds 60% of the maximum value of electric current that is supplied to a coil, a large side force acts between the housing portion and the movable core as the value of electric current that is supplied to the coil increases and approaches the electric current value at which the magnetic saturation occurs. In particular, when the movable core becomes eccentric relative to the housing portion so that a side gap becomes partially narrow or the movable core is brought into contact with the housing portion the side force increases drastically. Thus, when the side force increases there occurs a large resistance acting between the housing portion and the movable core. Consequently, the hysteresis of the reciprocating positions of the movable core increases relative to the electric current value in increasing and decreasing directions of electric current that is supplied to the coil.

When used herein, that a certain member is saturated magnetically means a state in which the magnetic flux density thereof increases to be so dense that no more magnetic flux is allowed to flow through the member. A state is not referred to as being magnetically saturated in which only part of the member such as a corner portion thereof becomes saturated but move magnetic flux can flow through the remaining portion of the member.

In addition, if any of the attracting portion, the housing portion and the movable core becomes saturated magnetically with an electric current value which is smaller than 40% of the maximum electric current value, the attracting force acting between the movable core and the attracting portion does not increase and therefore, in order to obtain a required travel, the number of turns of the coil must be increased.

Then, to cope with this, according to a first aspect of the present invention, there is provided an electromagnetic driving device in which any of an attracting portion, a housing portion and a movable core is set to become magnetically saturated when the value of electric current that is supplied to a coil increases to become a predetermined value which is between 40% or larger and 60% or smaller than the maximum value of electric current so supplied to the coil. Since magnetic saturation occurs when the electric current value reaches the predetermined value which is equal to or smaller than 60% of the maximum electric value, even if the movable core is eccentric relative to the housing portion, the upper limit value of the side force acting between the housing portion and the movable core can be reduced so that the upper limit value of sliding resistance acting between the housing portion and the movable core can be reduced in turn. Consequently, the hysteresis of the reciprocating positions of the movable core becomes small relative to the value of electric current that is supplied to the coil.

Furthermore, since there occurs no magnetic saturation until the value of electric current that is supplied to the coil reaches the predetermined value which is equal to or larger than 40% of the maximum electric value, a magnetic attraction force can be secured which is required to attract the movable core for displacement.

According to a second or fourth aspect of the present invention, there is provided an electromagnetic driving device wherein a non-magnetic layer is formed on at least one of the sides where the housing portion and the movable core are situated, respectively, to diametrically face each other, the total thickness of the non-magnetic layer so formed being between 40 $\mu$m or larger and 80 $\mu$m or smaller. Even if the movable core becomes eccentric relative to the housing portion, so that a side gap formed between the movable core and the housing portion becomes narrow locally, at least a magnetic gap equal in magnitude to the thickness of the non-magnetic layer so formed can be securely formed between the magnetic materials of the movable core and the housing portion. Consequently, even if the movable core becomes eccentric relative to the housing portion, the upper limit value of the side force acting between the housing portion and the movable core can be reduced so that the upper limit value of sliding resistance acting between the housing portion and the movable core can be reduced in turn. Consequently, the hysteresis of the reciprocating positions of the movable core becomes small relative to the value of electric current that is supplied to the coil.

According to a third, fifth or sixth aspect of the present invention, there is provided an electromagnetic driving device wherein the hardness of at least one of sliding surfaces of the housing portion and the movable core is made equal to or larger than HV200. The sliding resistance between the movable core and the housing portion at the sliding portion can be reduced by increasing the hardness of the sliding surface. Consequently, even if the movable core becomes eccentric relative to the housing portion, the upper limit value of the side force acting between the housing portion and the movable core can be reduced so that the upper limit value of sliding resistance acting between the housing portion and the movable core can be reduced in turn. Consequently, the hysteresis of the reciprocating positions of the movable core becomes small relative to the value of electric current that is supplied to the coil. Furthermore, since a difference in hardness between the sliding surfaces is set to be equal to or smaller than HV300, even if the movable core is forced to slide on the housing portion, the component which is smaller in hardness can be prevented from wearing in an imbalanced fashion.

According to a seventh aspect of the present invention, there is provided a flow rate controlling apparatus with an electromagnetic driving device according to any of the first to sixth aspects of the present invention. Consequently, a lower hysteresis can be provided due to a relationship between the increasing and decreasing directions of electric current and the reciprocating positions of the movable core. Consequently, the flow rate or pressure of the fluid can be controlled with high accuracy relative to the value of electric current that is supplied to the electromagnetic driving device.

The present invention may be more fully understood from the description of preferred embodiments of the invention set forth below, together with the accompanying drawings.

DESCRIPTION OF PREFERRED EMBODIMENTS

A mode for carrying out the invention will be described below based on preferred embodiments of the invention.

Figure 1:
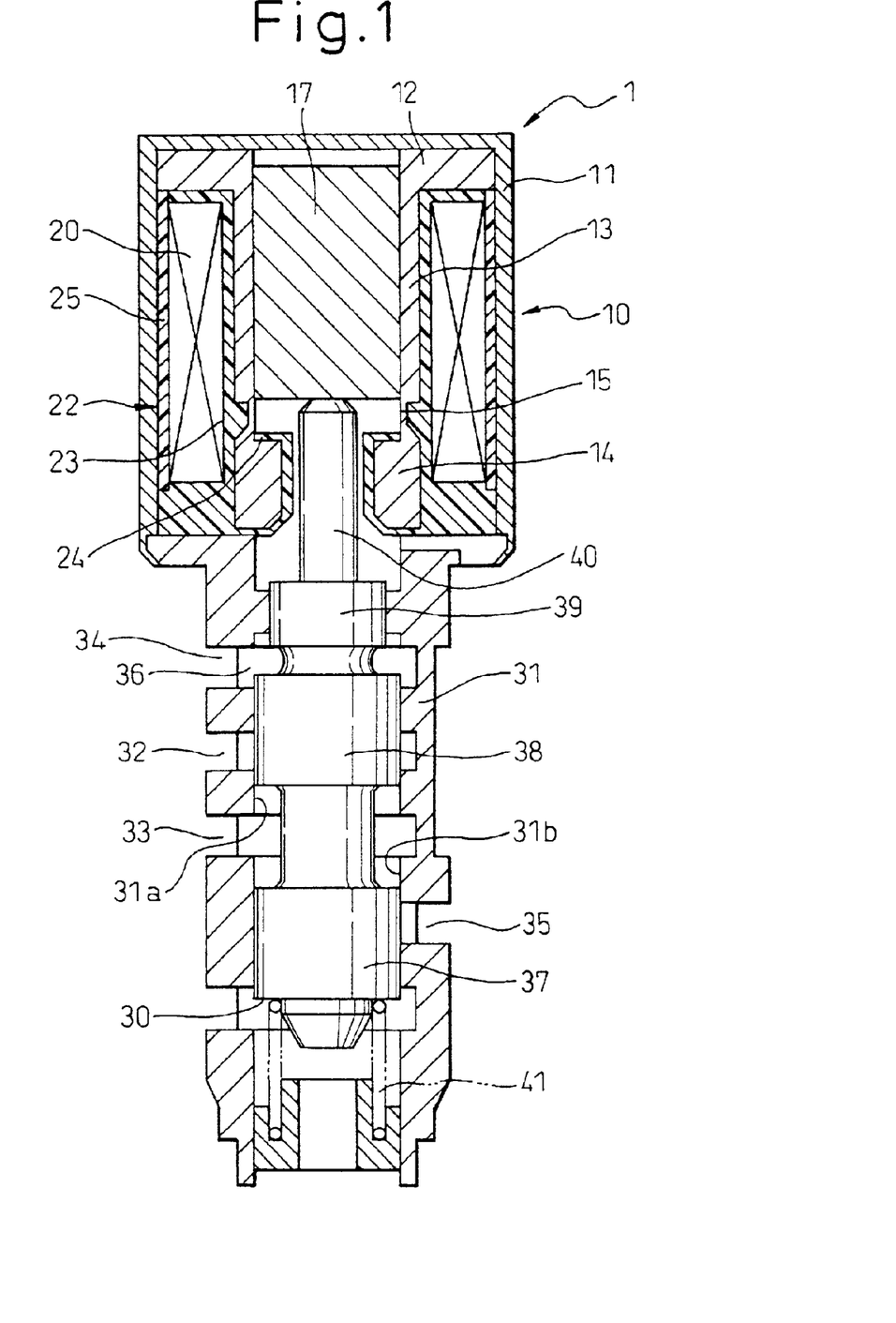
FIG. 1 is a sectional view showing a flow rate controlling apparatus according to a first embodiment of the invention.

Firstly, a first embodiment of the invention will be described. FIG. 1 shows a flow rate controlling apparatus according to the first embodiment of the invention.

The flow rate controlling apparatus 1 is, for example, a spool type hydraulic pressure controlling valve for controlling the pressure of hydraulic oil that is supplied to an automotive automatic transmission.

A linear solenoid 10 as an electromagnetic driving device has a cylindrical yoke 11, a stator core 12, a plunger 17 as a movable core and a oil 20. The yoke 11, stator core 12 and plunger 17 are made of a magnetic material. The yoke 11 and stator core 12 constitute a stator.

The yoke 11 holds the stator core 12 and a resin formed body 22 between itself and a housing 31 by caulking an end portion of the housing 31, which is supporting therein a spool 30 as a movable member, in such a manner as to move in a reciprocating fashion.

Figure 2:
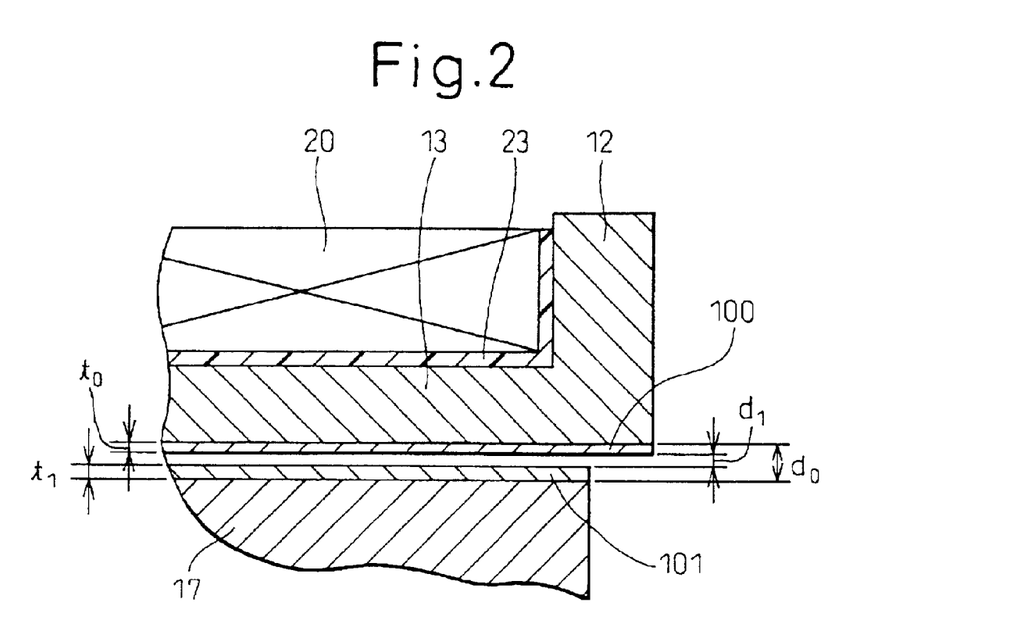
FIG. 2 is a sectional view showing a sliding portion between a housing and a plunger of the first embodiment.

The stator core 12 has an attracting portion 14 for generating an attraction force which attracts the plunger 17 in one of reciprocating directions which is integrated into the stator core 12 between a housing portion 13 for housing and supporting the plunger 17 in such a manner as to move in a reciprocating fashion therein and the plunger 17. A thin portion 15 is formed between the housing portion 13 and the attracting portion 14 which thin portion acts as a magnetic resistance portion for reducing the leakage of magnetic flux into between the housing portion 13 and the attracting portion 14. As shown in FIG. 2, a non-magnetic layer 100 and a non-magnetic layer 101 are formed on an inner circumferential wall of the housing portion 13 and an outer circumferential wall of the plunger 17, respectively, to prevent joining of the housing portion 13 and the plunger 17, as well as securing a magnetic gap formed in a radial direction between magnetic materials of the housing portion 13 and the plunger 17. Teflon coating, a coating comprising a combination of polyamide and Teflon, a coating comprising a combination of polyamide and molybdenum disulfide or NiP plating can be practically used as the non-magnetic layers.

The coil 20 shown in FIG. 1 is molded from a resin into a cylindrical shape and is fixed by the yoke 11 and the stator core 12. When electric current is supplied to the coil 20 from a terminal, not shown, which is electrically connected to the coil 10, magnetic flux flows to a magnetic circuit constituted by the yoke 11, the stator core 12 and the plunger 17 whereby a magnetic attraction force is generated between the attracting portion 14 of the stator core 12 and the plunger 17. Then, as this occurs, the plunger 17 moves downward as viewed in FIG. 1. The downward movement of the plunger 17 is restricted by a stopper 24.

The resin-molded body 22 has a bobbin 23 around an outer circumference of which the coil 20 is wound, the stopper 24 and a fixing portion 25 for fixing the coil 20 and forming a connector, not shown, for supplying electric current to the coil 20. The bobbin 23 is formed into a cylindrical shape and is formed from a resin so as to be integral with the stopper 24. The stopper 24 functions to prevent the contact of the plunger 17 with the attracting portion 14.

The housing 31 of the spool 30 houses and supports the spool 30 and allows it to reciprocate therein. Formed in the housing 31 are an inlet port 32, an outlet port 33, a feedback port 34 and a discharge port 35. The inlet port 32 is a port into which hydraulic oil flows which is supplied from a tank, not shown, by a pump. The outlet port 33 is a port from which hydraulic oil is supplied to an engagement device of an automatic transmission, not shown. The outlet port 33 and the feedback port 34 are caused to communicate with each other at a position outside the flow rate controlling apparatus, and part of hydraulic oil flowing out of the outlet port 33 is introduced into the feedback port 34. A feedback chamber 36 communicates with the feedback port 34. The discharge port 35 is a port for discharging hydraulic oil to the tank.

A large diameter land 37, a large diameter land 38 and a small diameter land 39 are formed on the spool 30 in that order from a counter-linear solenoid side. The small diameter land 39 has a diameter smaller than those of the large diameter lands 38, 39. Since the spool 30 is normally in abutment with the plunger 17 of the linear solenoid 10 via a shaft 40 of the spool 30, the spool 30 reciprocates within the housing 31 as the plunger 17 reciprocates. A spring 41 provided as a biasing means on the counter-linear solenoid side biases the linear solenoid 10 toward the linear solenoid 10.

The feedback chamber 36 is formed between the large diameter land 38 and the small diameter land 39, and the areas thereof differ from each other on which hydraulic pressure that is fed back due to the difference in outside diameter acts. Due to this, the hydraulic pressure in the feedback chamber 36 acts in such a manner as to press the spool 30 toward the counter-linear solenoid direction. Feeding-back part of the outputted hydraulic pressure in the flow rate controlling apparatus 1 is intended to prevent fluctuation in the output pressure that would be caused by fluctuation in the supplied hydraulic pressure or input pressure. The spool 30 is designed to stop stationarily at a position where a balance is kept among the biasing force of the spring 41, the pushing force of the plunger 17 with which the plunger 17 pushes against the spool 30 by virtue of a magnetic attraction force generated between the attracting portion 14 and the plunger 17 by electric current supplied by the coil 20 and the force which the spool receives from the hydraulic pressure in the feedback chamber 36.

The amount of hydraulic oil flowing from the inlet port 32 to the outlet port 33 is determined by a seal length which is a length of a portion where an inner circumferential wall 31a of the housing 31 and an outer circumferential wall of the large diameter land 38 overlaps each other. As the seal length becomes shorter, the amount of hydraulic oil flowing from the inlet port 32 to the outlet port 33 increases, whereas as the seal length becomes longer, the amount of hydraulic oil flowing from the inlet port 32 to the outlet port 33 decreases. Similarly, the amount of hydraulic oil flowing from the outlet port 33 to the discharge port 35 is determined by a seal length between an inner circumferential wall 31b of the housing 31 and an outer circumferential wall of the large diameter land 37.

When the spool 30 moves toward the spring 41 or downwardly as viewed in FIG. 1 by supplying electric current to the oil 20, the seal length between the inner circumferential wall 31a and the large diameter land 38 increases whereas the seal length between the inner circumferential wall 31b and the large diameter land 37 decreases, whereby the amount of hydraulic oil flowing from the inlet port 32 to the outlet port 33 decreases, whereas the amount of hydraulic oil flowing from the output port 33 to the discharge port 35 increases. As a result, the pressure of hydraulic oil flowing out of the outlet port 33 increases.

On the other hand, when the spool 30 moves toward the linear solenoid 10 the seal length between the inner circumferential wall 31a and the large diameter land 38 decreases whereas the seal length between the inner circumferential wall 31b and the large diameter land 37 increases, and therefore, the amount of hydraulic oil flowing from the inlet port 32 to the outlet port 33 increases whereas the amount of hydraulic oil flowing from the outlet port 33 to the discharge port 35 decreases. As a result, the pressure of the hydraulic oil flowing out of the outlet port 33 increases.

The flow rate controlling apparatus 1 regulates the pushing force with which the linear solenoid 10 pushes against the spool 30 toward the counter-linear solenoid 10 direction, as well as the pressure of hydraulic oil flowing out of the outlet port 10 by controlling the value of electric current fed to energize the coil 20. In case the value of electric current fed to energize the coil 20 is increased, the magnetic attraction force with which the attracting portion 14 attracts the plunger 17 in proportion to the electric current value increased, and the pushing force with which the plunger 17 pushes against the spool 30 in the counter-linear solenoid direction 10 also increases. The spool 30 stops stationarily at a position where a balance is kept between the force acting on the spool 30 from the plunger 17 due to the magnetic attraction force, the biasing force of the spring 41 and the force with which the spool 30 is pushed in the counter-solenoid 10 direction by virtue of the pressure of hydraulic oil fed back. Consequently, when the value of electric current fed to energize the coil 20 increases, the pressure of hydraulic oil flowing from the outlet port 33 decreases.

As has been previously stated, according to the first embodiment, the non-magnetic layer 100 and the non-magnetic layer 101 are formed on the inner circumferential wall of the housing portion 13 and the outer circumferential wall of the plunger 17, respectively. As shown in FIG. 2, assuming that the thickness of the non-magnetic layer 100 is t0, the thickness of the non-magnetic layer 101 is t1, a magnetic gap formed in a radial direction between the respective magnetic materials of the housing portion 13 and the plunger 17 which excludes the non-magnetic layers 100, 101 is d0, and an air gap formed in a radial direction between the non-magnetic layer 100 and the non-magnetic layer 101 when the plunger 17 does not deviate from but remains coaxial with the housing portion 13 is d1, the thicknesses are set so as to satisfy 40 $\mu$m$\leq$t0+t1$\leq$80 $\mu$m, d0$\approx$100 $\mu$m. Consequently, assuming that (d1/d0)×100 is eccentricity, the eccentricity is set to substantially satisfy 20%$\leq$eccentricity$\leq$60%.

Figure 3:
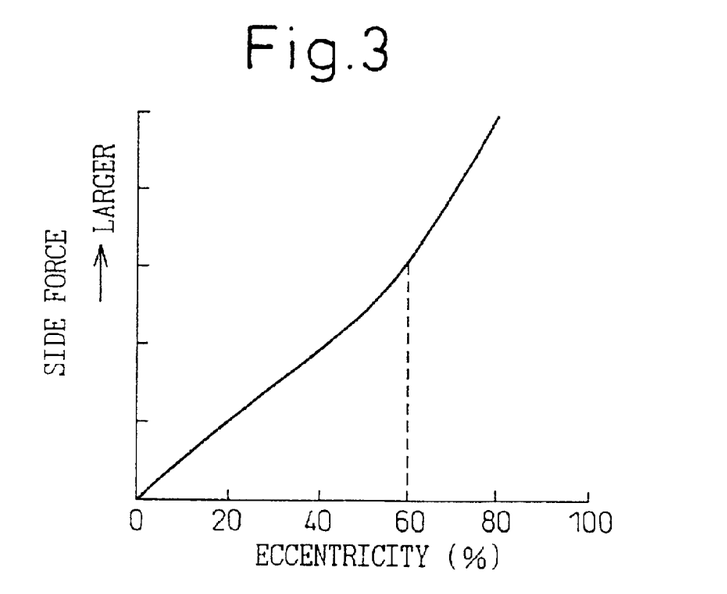
FIG. 3 is a graph showing the characteristics of a relationship between eccentricity and a side force.

As shown in FIG. 3, the eccentricity is in proportion to the side force until the eccentricity reaches 60%, and when it exceeds 60% the side force increases drastically relative to the eccentricity. With a large eccentricity, when the plunger 17 becomes eccentric relative to the housing portion 13 the magnetic gap formed between the magnetic materials of the housing portion 13 and the plunger 17 becomes small, whereby magnetic flux flowing in a radial direction between the housing portion 13 and the plunger 17 increases, this increases the side force. In contrast, with a small eccentricity, the side gap resulting in a state in which the plunger 17 deviates eccentrically from the housing portion 13 becomes small, this making it impossible for the plunger 17 to slide smoothly. In the first embodiment, by setting the eccentricity to substantially satisfy 20%$\leq$eccentricity$\leq$60%, even if the axial center of the plunger 17 deviates from that of the housing portion 13, an extreme increase in side force is prevented and moreover, the smooth reciprocating movement of the plunger 17 is secured.

Figure 4:
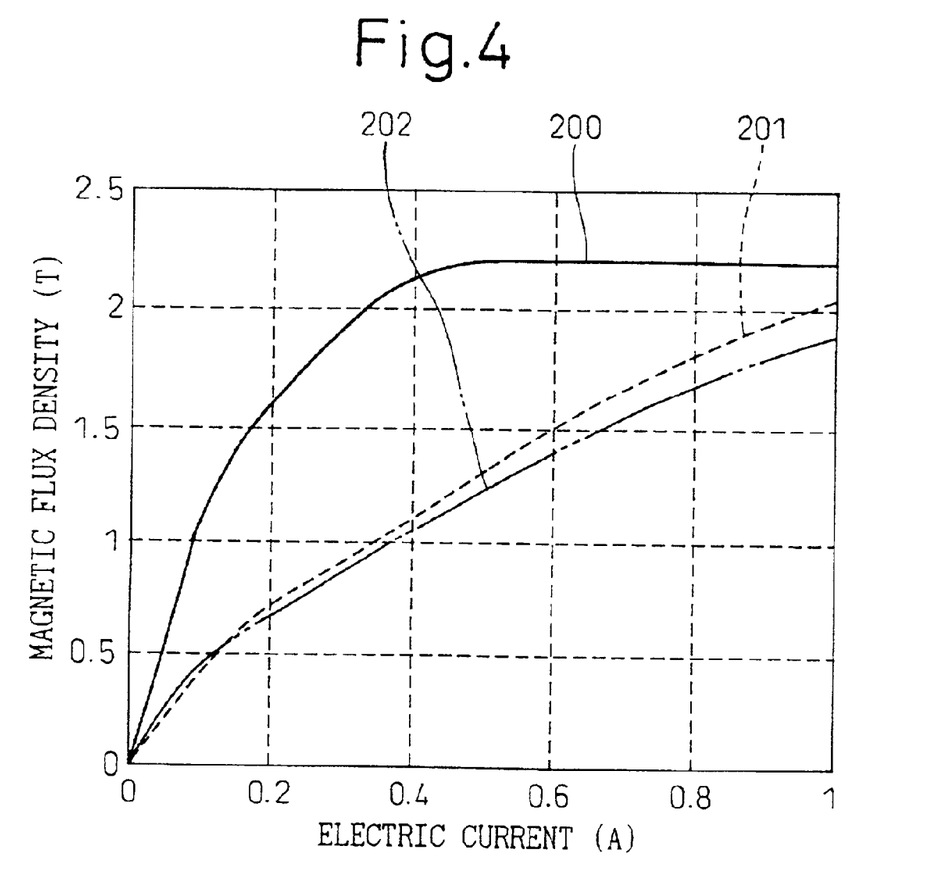
FIG. 4 is a graph showing the characteristics of a relationship between the value of electric current that is supplied to a coil and magnetic flux density.

Next, FIG. 4 shows a relationship between the value of electric current that is supplied to the coil 20 and magnetic flux densities of the housing portion 13, the attracting portion 14 and the plunger 17. In FIG. 4, reference numeral 200 denotes the magnetic flux density of the attracting portion 14, 201 the magnetic flux density of the plunger 17 and 202 the magnetic flux density of the housing portion 13.

Assuming that the maximum value of electric current supplied to the coil 20 is 1A (ampere), the attracting portion 14 gets saturated magnetically when the electric current value reaches approximately 0.5A or 50% of the maximum electric current value. The magnetic flux densities of the respective portions increase as the electric current value increases until the electric current value reaches 0.5A. However, since the electric current value is small, the side force is also small. On the contrary, when the electric current value exceeds 0.5A, since the magnetic flux densities of the housing portion 13 and the plunger 17 increase, even if the axial center of the plunger 17 deviates from that of the housing portion 13, the increasing amount of magnetic flux flowing in the radial direction between the housing portion 13 and the plunger 17 decreases. Consequently, the local increase in side force is thus prevented.

Figure 5:
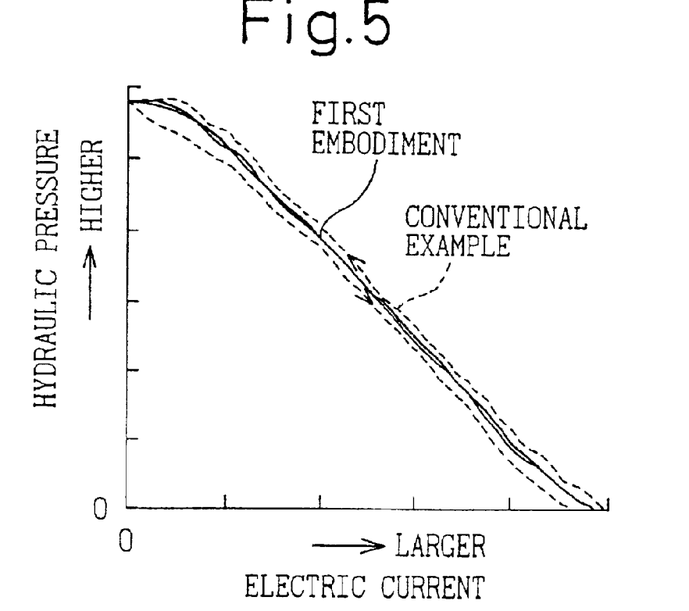
FIG. 5 is a graph showing the characteristics of a relationship between the value of electric current that is supplied to the coil and hydraulic pressure.

In case the side force increases, the sliding resistance between the housing portion 13 and the plunger 17 increases. Consequently, the difference between the reciprocating positions of the plunger 17 resulting as the value of electric current fed to energize the coil 20 and the reciprocating positions of the plunger 17 resulting as the value of electric current fed to energize the coil 20 decreases becomes large with the electric current value remaining the same. Namely, the hysteresis increases. In case the reciprocating positions of the plunger 17 and the spool 30 are different for the same electric current value in the increasing and decreasing directions of the value of electric current that is supplied to the coil 20, as illustrated by a conventional example shown in FIG. 5, the difference in the values of hydraulic pressures at the outlet port 33 for the same electric current value becomes large in the increasing and decreasing directions of the electric current value. Thus, with a large hysteresis, like this, happening along the hydraulic pressure circuit where the hydraulic pressure needs to be controlled with high accuracy as in the case of the hydraulic pressure control in an automotive automatic transmission, the hydraulic pressure cannot be controlled with high accuracy.

In the first embodiment, the eccentricity is suppressed to an eccentricity of 60% or smaller by forming the non-magnetic layers 100, 101 on the internal circumferential wall of the housing portion 13 and the inner circumferential wall of the plunger 17, respectively. Furthermore, the attracting portion 14 gets saturated magnetically when the value of electric current that is supplied to the coil 20 increases to reach approximately 50% of the maximum electric current value. Since the increase in side force is suppressed even if the value of electric current supplied to the coil 20 increases from 0.5A, the upper limit value of the sliding resistance acting between the housing portion 13 and the plunger 17 by reducing the upper limit value of the side force even if the axial center of the plunger 17 deviates from that of the housing portion 13. Consequently, the reciprocating positions of the plunger 17 and the spool 30 or the difference in hydraulic pressures, with the electric current value remaining the same, becomes small in the increasing and decreasing directions of the value of electric current supplied to the coil 20, and thus the hysteresis becomes small. Consequently, the hydraulic pressures can be controlled with high accuracy by regulating the electric current value.

In the first embodiment, when an attracting portion 14 becomes saturated magnetically, any of the housing portion 13, the attracting portion 14 and the plunger 17 may be saturated magnetically by altering the setting of the area of the magnetic path. In addition, the value of electric current at which magnetic saturation occurs may be between 40% or larger to 60% or smaller of the maximum value of electric current that is supplied to the coil 20.

In a case where any of the housing portion 13, the attracting portion 14 and the plunger 17 is set to get saturated magnetically when the value of electric current exceeds 60% of the maximum electric value, when the plunger 17 becomes eccentric relative to the housing portion 13 whereby the side gap becomes narrow partially or the value of electric value increases to approach the electric current value when magnetic saturation occurs in a state in which the plunger 17 is in contact with the housing portion 13, a very large side force is generated. When the side force becomes large like this, as a large sliding resistance works between the housing portion 13 and the plunger 17, the hysteresis of the reciprocating positions of the plunger becomes large relative to the value of electric current that is supplied to the coil 20.

In addition, in the case where any of the housing portion 13, the attracting portion 14 and the plunger 17 is set to be saturated magnetically when the value of electric current is smaller than 40% of the maximum electric value, the magnetic attraction force working between the plunger 17 and the attracting portion 14 does not increase. If the number of turns of the coil 20 is increased with a view to obtaining a required travel, the size of the linear solenoid 10 is enlarged.

Therefore, the electric current value at which magnetic saturation occurs is desirably between 40% or larger and 60% or smaller of the maximum value of electric current that is supplied to the coil 20.

In the first embodiment, the non-magnetic layers 100, 101 are formed and the eccentricity is set to substantially satisfy 20%≦eccentricity≦60% by making the total thickness of the layers satisfy 40 $\mu$m≦t0+t1≦80 $\mu$m. In addition, the electric current value at which magnetic saturation occurs is set to be between 40% or larger and 60% or smaller of the maximum value of electric current that is supplied to the coil 20. In contrast to this, either of the two conditions described above may be realized; setting the eccentricity to substantially satisfy 20%≦eccentricity≦60% or setting the electric current value at which any of the housing portion 13, the attracting portion 14 and the plunger 17 gets saturated magnetically so as to be between 40% or larger and 60% or smaller of the maximum value of electric current that is supplied to the coil 20.

In addition, while the non-magnetic layers are formed both on the housing portion 13 and the plunger 17, the non-magnetic layer of a thickness ranging between 40 cm and 80 cm may be formed on at least either of the housing portion 13 and the plunger 17.

Figure 6:
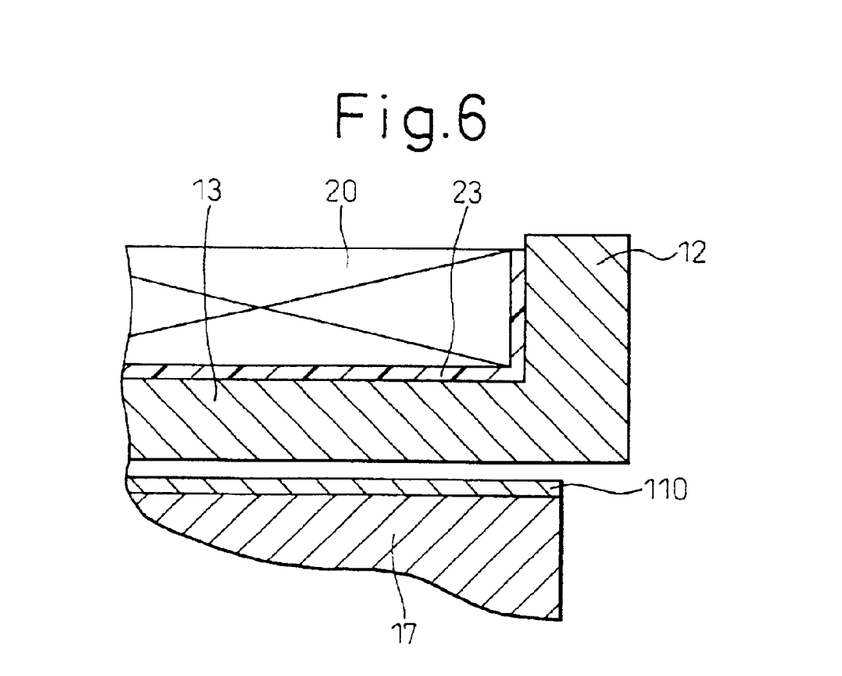
FIG. 6 is a sectional view of a sliding portion between a housing portion and a plunger according to a second embodiment of the invention.
Figure 7:
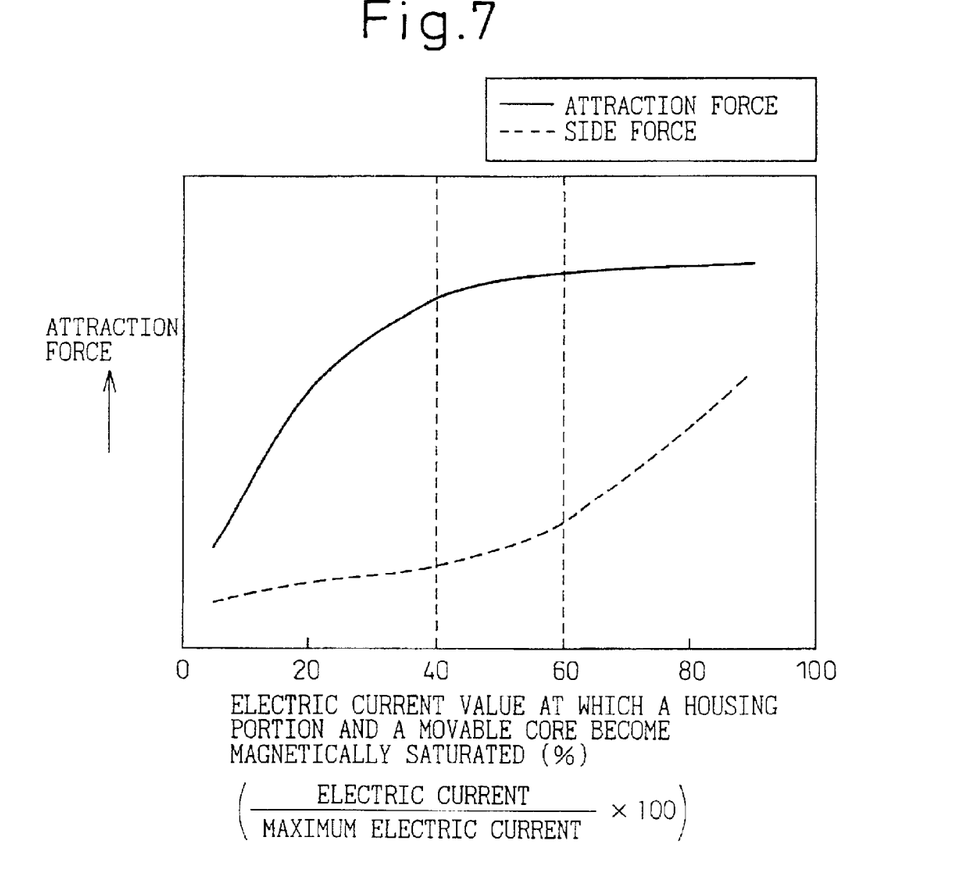
FIG. 7 is a graph showing the characteristics of a relationship between electric current value at which a housing portion and a movable core become magnetically saturated and attraction force.

Next, a second embodiment of the invention will be described. The second embodiment of the invention is shown in FIG. 6. Reference numerals used in the first embodiment will be imparted to like constituent components similar to those described with respect to the first embodiment.

In the second embodiment, a slight nitrification is applied to a stator core 12 so as to increase the hardness of an inner circumferential surface of a housing portion 13 to the order of HV600. Furthermore, the hardness of an outer circumferential surface of a plunger 17 is increased to the order of HV900. Thus, the sliding resistance between the housing portion 13 and the plunger 17 can be reduced by increasing the hardness of the sliding surfaces of the housing portion 13 and the plunger 17. Consequently, the difference in the pressure of hydraulic oil with the electric current value remaining the same becomes small in increasing and decreasing directions of electric current that is supplied to a coil 20. In case the difference in hardness between the inner circumferential surface of the housing portion 13 and the outer circumferential surface of the plunger 17 becomes too large, one of the surfaces tends to wear in an imbalanced fashion, and therefore, the difference in hardness between the sliding surfaces is desirably HV300 or smaller.

In the two embodiments that have been described heretofore to illustrate the mode for carrying out the invention, the electromagnetic driving device according to the invention is applied to the electromagnetic driving portion of the spool type hydraulic pressure controlling valve. In addition thereto, the electromagnetic driving device according to the invention may be used as a driving device for any type of flow rate controlling apparatus which is intended to increase the attracting force of the movable core without enlarging the size thereof.

While the invention has been described by reference to the specific embodiments chosen for purposes of illustration, it should be apparent that numerous modifications could be made thereto by those skilled in the art without departing from the basic concept and scope of the invention.

What is claimed is:

1. An electromagnetic driving device comprising;
    a movable core,
    a stator having a housing portion for housing said movable core in such a manner as to move in a reciprocating fashion therein, and an attaching portion, a magnetic force being generated between said attracting portion and said movable core for attracting said movable core to move in one reciprocating movement direction and cooperating with said movable core to form a magnetic circuit, a coil for generating a magnetic force which attracts said movable core to said attracting portion side when energized, and a non-magnetic layer formed on at least one of sides where said housing portion and said movable core are situated, respectively, to diametrically face each other, wherein an eccentricity R defined as $(d_1/d_0) \times 100$ is set so as to satisfy $20\% \leq R \leq 60\%$, where $d_0$ is a magnetic gap which is formed in a radial direction between the housing portion and the movable core, excluding the non-magnetic layer, and $d_1$ is an air gap which is formed in a radial direction between the facing surfaces of the housing portion and the movable core, including the non-magnetic layer, when the movable core does not deviate from, but remains coaxial with, the housing portion, wherein a first non-magnetic layer is formed on an inner circumferential wall of the housing portion and a second non-magnetic layer is formed on an outer circumferential wall of the movable core, said air gap being formed in a radial direction between said first and second non-magnetic layers and said magnetic gap being formed between magnetic materials of the housing portion and the movable core.

2. An electromagnetic driving device as set forth in claim 1, wherein a thin portion is formed between the housing portion and the attracting portion, said thin portion defining a magnetic resistance portion for reducing a leakage of magnetic flux between the housing portion and the attracting portion.

3. An electromagnetic driving device as set forth in claim 1, wherein said non-magnetic layers comprises layers selected from the group consisting of a teflon coating, a coating comprising a combination of polyamide and teflon, a coating comprising a combination of polyamide and molybdenum disulfide, and NiP plating.

4. An electromagnetic driving device as set forth in claim 1, wherein if said first non-magnetic layer has a thickness t0 and the second non-magnetic layer has a thickness t1 the thicknesses are set so as to satisfy $40\mu m \leq t0+t1 \leq 80\mu m$.

5. An electromagnetic driving device as set forth in claim 1, wherein any of said attracting portion, said housing portion and said plunger portion becomes saturated magnetically when the value of electric current that is supplied to said coil increases to reach a predetermined value which falls between 40% or larger and 60% or smaller of a maximum value of electric current that is supplied to said coil.

* * * * *